United States Patent

Schläfer et al.

[11] 4,002,606
[45] Jan. 11, 1977

[54] WATER-SOLUBLE PHENYL-AZO-NAPHTHYL COMPOUNDS

[75] Inventors: Ludwig Schläfer, Fischbach, Taunus; Ernst Hoyer, Frankfurt am Main, both of Germany

[73] Assignee: Hoechst Aktiengesellschaft, Frankfurt am Main, Germany

[22] Filed: Sept. 3, 1974

[21] Appl. No.: 502,501

[30] Foreign Application Priority Data

Sept. 3, 1973    Germany ............... 2344333

[52] U.S. Cl. .................................. 260/196
[51] Int. Cl.² ............. C09B 29/06; D06P 3/10; D06P 3/24; D06P 3/66
[58] Field of Search ..................... 200/196

[56] References Cited
FOREIGN PATENTS OR APPLICATIONS

| | | |
|---|---|---|
| 1,911,427 | 9/1970 | Germany ............... 260/196 |
| 1,286,144 | 1/1969 | Germany ............... 260/196 |
| 1,150,978 | 5/1969 | United Kingdom ........ 260/196 |

*Primary Examiner*—Daniel E. Wyman
*Assistant Examiner*—John J. Doll
*Attorney, Agent, or Firm*—Curtis, Morris & Safford

[57] ABSTRACT

New water-soluble monoazo compounds had been found which, in the form of the free acid, correspond to the formula

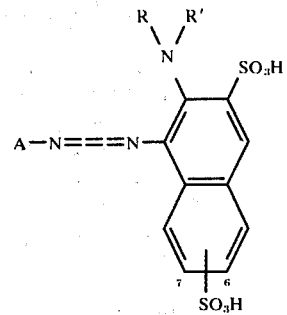

in which
A represents a phenyl radical of the formula

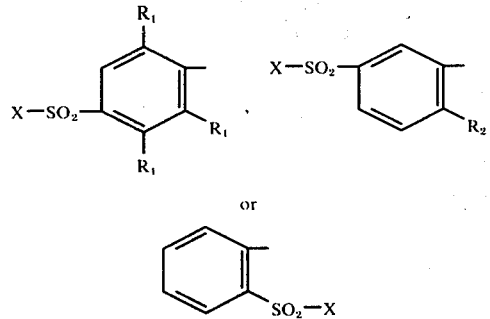

or in which
the substituents $R_1$ are the same or different and each is hydrogen, chlorine, lower alkyl or alkoxy, $R_2$ is hydrogen, halogen, a sulfo group, a sulfonamide or a lower alkoxy group, R is hydrogen or lower alkyl, R' is hydrogen, a lower alkyl group or an optionally substituted phenyl group, and X is a vinyl group or a radical of the formula $-CH_2-CH_2-Z$ wherein Z is an inorganic or organic radical capable of being split off by an alkaline agent. These compounds can be prepared by coupling of the corresponding phenyl diazo compounds with the corresponding aminonaphthalene coupling compounds in an acid to neutral medium. The novel compounds can be utilized as very valuable dyestuffs, especially as fibre-reactive dyestuffs, for the dyeing of, for example, wool, silk, leather, polyurethane and polyamide fibres and of regenerated or native cellulose and yield dyeings and prints of excellent color build-up and tinctorial strength which are distinguished by several very good fastness properties.

9 Claims, No Drawings

WATER-SOLUBLE PHENYL-AZO-NAPHTHYL COMPOUNDS

The present invention relates to new water-soluble monoazo compounds which, in the form of the free acid, correspond to the general formula (1)

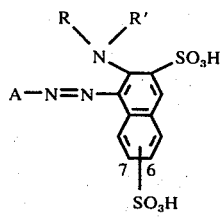

in which

A represents a phenyl group of the formulae (2), (3) or (4)

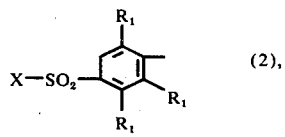

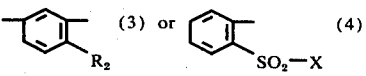

in which

- $R_1$ are identical or different each standing for a hydrogen atom, a chlorine atom, an alkyl group with 1 to 4 carbon atoms, especially the methyl or ethyl group, or an alkoxy group with 1 to 4 carbon atoms, especially the methoxy or ethoxy group,
- $R_2$ stands for a hydrogen atom, a halogen atom, especially a chlorine or bromine atom, a sulfonic acid or sulfonic acid amide group or an alkoxy group with 1 to 4 carbon atoms, especially the methoxy or ethoxy group,
- X stands for the vinyl radical or a radical of the formula $-CH_2-CH_2-Z$, in which Z stands for an inorganic or organic radical, capable of being split off by an alkaline agent,
- R stands for a hydrogen atom or an alkyl group with 1 to 4 carbon atoms,
- R' stands for a hydrogen atom, an alkyl group with 1 to 4 carbon atoms or a phenyl radical, which may additionally be substituted by methyl, ethyl, methoxy or ethoxy groups, and the sulfonic acid group in the naphthyl radical stands in 6- or 7-position.

Preference is given to the alkali salts, especially to the sodium and potassium salts of the compounds of formula (1).

The present invention concerns furthermore a process for the preparation of these compounds corresponding to formula (1). This process is performed by coupling a diazotized amine of the general formula (5)

$$A - NH_2 \qquad (5)$$

in which A has the beforementioned signification, with a naphthylamino compound of the formula (6)

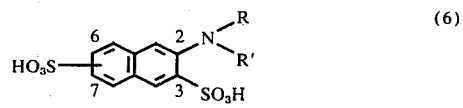

in which R and R' have the beforementioned significations and a sulfo group in 6- or 7-position of the naphthyl radical, at pH values between 0 and 7, preferably between 1 and 4.

The compounds of the formula (1) wherein X stands for a radical of the formula $-CH_2-CH_2-OH$ obtainable in this way, may be converted by methods known per se into compounds of the formula (1), wherein X stands for the vinyl group or a group of the formula $-CH_2-CH_2-Z$, wherein Z stands for a group having the abovementioned signification, except the hydroxy group, especially in this way that the hydroxy group, standing for the radical Z is esterified with suitable inorgannic or organic acids or their derivatives and that optionally these esters are converted into the corresponding vinyl compounds by means of an alkaline agent, especially by alkali metal hydroxides and carbonates, or that the ester group is replaced in a weakly acid, neutral or alkaline medium by another group which can be split off by alkaline agents under the influence of a nucleophilic compound containing this group.

As inorganic or organic radicals Z, capable of being split off by alkaline agents, there should be mentioned: the hydroxy group, a halogen atom such as chlorine or bromine, alkylsulphonyloxy, or alkylsulfonylamino group having 1 to 5 carbon atoms, such as the methylsulfonyloxy or methylsufonylamine group, an arylsulfonyloxy, arylsulfonylamino, especially the phenylsulfonyloxy and toluylsulfonyloxy group, and thereof especially the p-toluylsulfonyloxy group or the meta-nitro-benzenesulfonyloxy group, and the amido radicals of them, furthermore alkanyloxy group having 1 to 4 carbon atoms, especially the acetoxy group, arylcarbonyloxy groups, such as, for example, the benzoyloxy- or the 3-sulphobenzoyloxy group, the phenoxy, lower dialkylamino groups, especially the dimethylamino- and diethylamino groups, trialkylammonium groups having preferably 1 to 4 carbon atoms in each of the alkyl groups, preferably the trimethylammonium group, the hydroxy group, the thiosulfato ($-SSO_3H$ or its metal salts, preferably alkali metal salts), the phosphato ($-OPO_3H_2$ or its metal salts, preferably alkali metal salts) and especially the sulfato group ($-OSO_3H$ or its metal salts, preferably alkali metal salts).

The conversion of compounds of the general formula (1) in which X stands for the grouping $-CH_2-CH_2-OH$ into compounds of the formula (1) in which X stands for the grouping $-CH_2-CH_2-OSO_3$ is effected by methods known per se with sulfating agents, such as, for example, concentrated or anhydrous sulfuric acid, chlorosulfonic acid, amidosulfonic acid or sulphur trioxide-yielding agents.

For the conversion of compounds of the general formula (1) in which X stands for the group $-CH_2-CH_2-OH$ into such compounds of the formula (1) in which X stands for the group $-CH_2-CH_2-OPO_3H_2$, phosphating agents are used such as, for example, concentrated orthophosphoric acid, pyrophosphoric acid and polyphosphoric acid or phosphorus oxychloride. Compounds of the general formula (1) in which X stands for an alkyl- or arylsulphonyloxyethyl group or an alkyl- or arylcarbonyloxy-ethyl group can be obtained, for example, from compounds of the formula (1), in which X stands for the group —CH$_2$-CH$_2$-OH, by converting them by methods known per se with alkyl- or arylsulfonic-acid chlorides or with carboxylic acid chlorides or anhydrides.

Compounds of the general formula (1) in which X stands for an ethyl group substituted in β-position by the thiosulfuric acid ester radical or a dialkylamino group, are prepared starting from compounds of the general formula (1) in which X stands for the vinyl group, in usual manner by reaction with a salt of the thiosulfuric acid or by reaction with dialkylamines, such as, for example, dimethylamine.

The aromatic amines of the formula (5), used for the preparation of the new compounds in which X stands for the group —CH$_2$-CH$_2$-OH, can be prepared, for example, by conversion of the optionally substituted acetamino or nitrobenzenesulfonic acid chloride into the corresponding sulfinic acid which is converted into the corresponding acetamino- or nitro-(β-hydroxyethyl-sulfonyl)-benzene by means of ethylene oxide or β-chloroethanol and subsequently saponifying these by acid agents, or if the nitro group is present, reducing it to the amino group by means of a catalyst or another suitable process.

The so-obtained amines of the general formula (5) in which X stands for the group —CH$_2$-CH$_2$-OH can be converted by generally known processes into amines of the general formula (5), in which X stands either for the vinyl group or for an ethyl group substituted in β-position by an organic or inorganic radical which can be split off by an alkaline agent, which can equally serve as starting material for the preparation of the new monoazo compounds.

The preparation of amines of the general formula (5) in which X stands for the group —CH$_2$CH$_2$-OSO$_3$H can also be effected by a treatment of the corresponding N-acetyl compound of the amine of the general formula (5) in which X stands for the group —CH$_2$-CH$_2$-OH, by means of sulfuric acid at elevated temperature and under simultaneous saponification of the acetylamino group or by reduction of the nitro group of a corresponding nitrobenzene compound.

By esterification of starting compounds (5) in which X stands for the group —CH$_2$-CH$_2$-OH, with orthophosphoric acid, pyrophosphoric acid, polyphosphoric acid or phosphoroxy chloride it is possible to prepare the corresponding phosphoric acid esters of the general formula (5), in which X stands for the group —CH$_2$-CH$_2$-OPO$_3$H$_2$.

The isolation of the monoazo compounds obtainable according to the process described is effected by salting out, for example with sodium or potassium chloride or by spray-drying the manufacturing mixture.

The new compounds of the present invention which, in form of the free acid, correspond to the formula (1), have been found to be very valuable dyestuffs which are especially suitable for dyeing and printing of nitrogen-containing fiber materials such as, for example, sool, silk, leather, polyurethane or polyamide fiber materials, and excellently suitable for dyeing and printing of native or regenerated cellulose fiber materials such as, for example, cotton, spun rayon, viscose rayon and linen. The dyestuffs can preferably be employed in accordance with dyeing and printing processes for reactive dyestuffs which are generally customary in industry, and yield for example on cellulose fiber materials, in the presence of agents having an alkaline effect, very deep and strong dyeings and prints with very good fastnesses to light and to wet processing, whereby the good fastnesses to oxidative treatment, such as, for example, the fastnesses to nitrogen oxides, peroxides and chlorine are to be stressed especially. The dyestuffs of the invention have a very good absorptive power in a long bath and an excellent build-up ability.

Compared with the structurally closely related monoazo dyestuffs described in German Patent No. 1,911,427, the monoazo dyestuffs of the present invention are superior with regard to colour build-up in the generally applied dyeing and printing processes for reactive dyes and with regard to fastnesses to oxidative treatment, for example, to chlorinated bathing water, chlorine bleaching, to light and to exhaust gas.

Among the new compounds of the present invention, those compounds are especially preferred and advantageous which in form of the free acid correspond to the formulae (7a), (7b) and (7c)

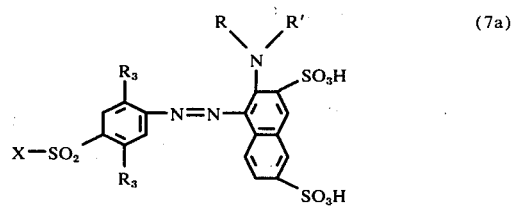

(7a)

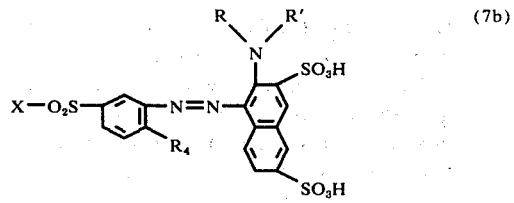

(7b)

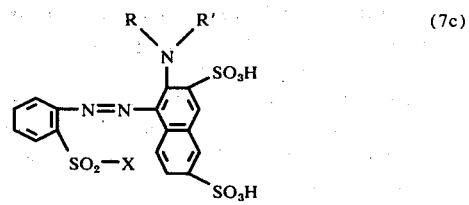

(7c)

in which X, R and R' have the above-mentioned signification, R$_3$ is identical or different, each standing for a hydrogen atom, a chlorine atom, the methyl, ethyl, methoxy or ethoxy group, R$_4$ standing for a hydrogen atom, chlorine, sulfonic acid, methyl, ethyl, methoxy or ethoxy group.

Among these compounds those have been found to be very suitable and advantageous regarding dyeing techniques and properties, which correspond to the formulae (7a), (7b) and (7c), wherein X represents the vinyl, β-thiosulfatoethyl, β-phosphatoethyl, β-sulfatoethyl, β-acetoxyethyl, β-trimethylammonium-ethyl-β -N,N-dimethylamino-ethyl, β-N,N-diethylamino-ethyl or β-chloroethyl group.

Emphasis is however especially given to the dyestuffs of the general formulae (8a), (8b) and (8c)

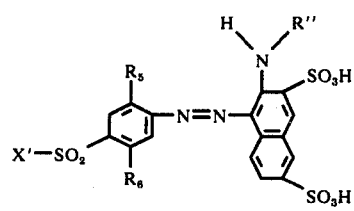 (8a)

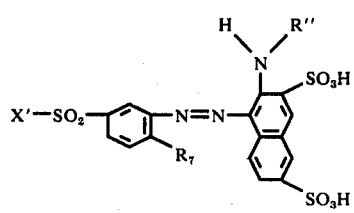 (8b)

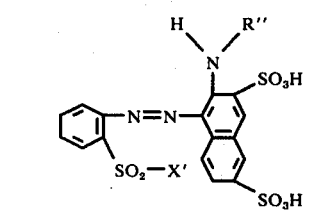 (8c)

in which R'' stands for a hydrogen atom or a methyl group, X' for the vinyl group, the β-phosphato-ethyl, β-sulfatoethyl, β-thiosulfatoethyl or the β-chloroethyl group, $R_5$ for a hydrogen atom or the methoxy group, $R_6$ for a hydrogen atom, the methyl or methoxy group, $R_7$ for a hydrogen atom, a chlorine atom or the sulfo group.

Among the dyestuffs of the present invention, those mentioned in the Examples 1, 2, 3 and 8 as well as in the Examples 1, 8, 14, 17, 18, 21, 22, 24, 27, 30, 33 and 34 of the table are especially advantageous.

The following Examples illustrate the invention. Parts and percentages are by weight unless stated otherwise. Parts by weight and parts by volume are in the ratio as gram to milliliters.

EXAMPLE 1:

28.1 Parts of aminobenzene-4-β-sulfatoethylsulfone were dissolved in water with sodium carbonate to give a neutral solution: 35 parts by volume of hydrochloric acid (31%) in 100 parts by volume of water were added, and the amine was diazotized at 0° to 5° C with 20 parts by volume of a 5 N sodium nitrite solution. 30.3 Parts of 2-naphthylamino-3,6-disulfonic acid were dissolved in 100 parts by volume of water together with sodium carbonate to give a neutral solution and coupled with the suspension of the diazonium salt. The solution was adjusted to a pH value of 2 – 4 and stirred during 2 hours. The monoazo dyestuff was salted out by adding sodium chloride and suction-filtered. After drying at 80°–100° C 100 parts of a 50% salt-containing dyestuff were obtained which, in the form of the free acid corresponds to the formula $$HO_3SOCH_2CH_2-O_2S-\text{\<benzene\>}-N=N-\text{\<naphthalene with }H_2N, SO_3H, SO_3H\text{\>}$$

For the isolation of the dyestuff the initial reaction mixture can also be evaporated at 80° – 100° C or spray-dried instead of salting out.

The dyestuff yields, when applied on wool, silk, polyamide and polyurethane fiber materials as well as on cellulose fibers in neutral and alkaline medium, clear reddish yellow dyeings and prints having an excellent build-up and excelling by their very good fastness to light and to wet processing as well as by their excellent stability to chlorine and other oxidation agents as well as to exhaust gas. If used in a long bath the dyestuff is well absorbed on cotton, wool and polyamide.

The prints show a very high sharpness of the outlines and purity of the white bottom.

EXAMPLE 2:

A neutral solution of 57.5 parts of the dyestuff obtained according to Example 1, in 2000 parts by volume of water was adjusted at 25°–30° C to a pH value of 11 – 12 with concentrated solution of sodium hydroxide, stirred during 10 minutes, salted out with sodium chloride and suction-filtered. The press cake is washed neutral with 500 parts by volume of an aqueous 10% solution of sodium chloride and dried at 80–100° C. 64 Parts of a salt-containing dyestuff having a strength of 70% was obtained which, in form of the free acid corresponds to the formula

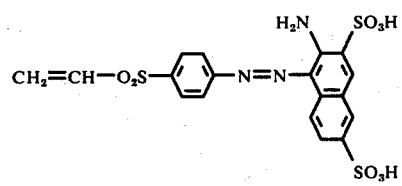

The dyestuff differs from the dyestuff described in Example 1 only by a somewhat lower solubility in a neutral aqueous medium.

EXAMPLE 3:

37.5 Parts of crystallized sodium thiosulfate are added to a neutral solution of 47.9 parts of the dyestuff obtained in Example 2, in 1500 parts by volume of water and the whole was stirred for 6 hours at 60°–65° C. By adding dilute acetic acid, the pH value is maintained at 5 – 6. The dyestuff solution is salted out or spray-dried. A yellow-brown powder is obtained which is very readily soluble in water. In the form of the free acid the so obtained dyestuff corresponds to the formula

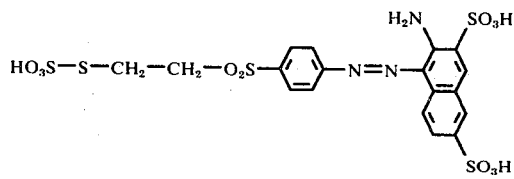

The dyestuff presents the same good qualities as those described in Examples 1 and 2, as well as the same shade.

EXAMPLE 4:

26.35 Parts of 1-amino-2-methoxy-5-methyl-4-β-chloroethylsulfonylbenzene are suspended in 100 parts by volume of water, and 50 parts by volume of a 31% hydrochloric acid are added, and cooled. 17.3 Parts of a 40% sodium nitrite solution are added, and the whole was stirred during 2 hours at 5° to 10° C. Afterwards, the neutral solution of 33.1 parts of 2-N,N-dimethylaminonaphthalene-3,7-disulfonic acid in 100 parts by volume of water is poured into the suspension of the diazonium salt; the pH value of the reaction mixture is adjusted with sodium carbonate at 4 and stirring is continued for 4 hours. The azo dyestuff is obtained by salting out or by spray-drying of the reaction mixture.

90 g of a salt-containing dyestuff powder having a strength of about 55%, was obtained which, in form of the free acid corresponds to the formula

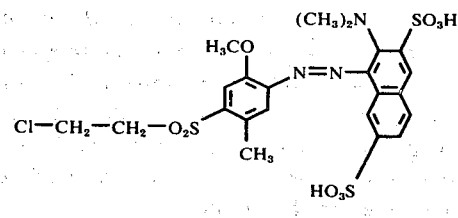

The dyestuff yields on wool, silk, polyamide and polyurethane fiber materials and also on cellulose fibers, when applied with a neutral or alkaline dyeing and padding liquor or printing paste, clear orange dyeings and prints having an excellent color build-up and very good fastness to light and to wet processing as well as an excellent stability to chlorine and to detergents peroxide-containing as well as to exhaust gas. If used in a long bath the dyestuff is very well absorbed on cotton, wool and polyamide fiber materials.

The prints show a very high sharpness of the outlines and purity of the white bottom.

EXAMPLE 5:

30 Parts of the dyestuff obtained in Example 4 are suspended in 200 parts by volume of water and 30 parts by volume of a 30% hydrochloric acid and stirred under reflux during 2 hours. The reaction mixture is cooled and, for a better and complete separation of the dyestuff, 20 parts of sodium chloride are added. The precipitated brown-red dyestuff powder is suction-filtered and washed neutral with an aqueous solution of sodium chloride. After drying at 80°–100° C, 35 parts of a salt-containing dyestuff was obtained which, in form of the free acid corresponds to the formula

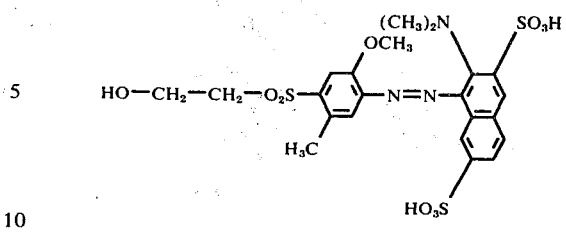

If padded or printed in the presence of acid binding agents on wool, polyamide or cellulose fibers and subsequently steamed or thermofixed, the dyestuff yields pad dyeings and prints which are fast to washing and light which have the same qualities as the dyeings and prints obtained with the dyestuff of Example 4.

EXAMPLE 6:

60 Parts of the dyestuff of Example 4 are dissolved in 700 parts by volume of water together with sodium carbonate to give a neutral solution at 30° C and 80 parts of diethylamine are added. A pH value of 12 to 12.5 is adjusted by adding dropwise an aqueous concentrated sodium hydroxide solution; stirring is continued for several hours at 20°–25° C. Afterwards the pH value is adjusted with hydrochloric acid at 5 –6; the dyestuff is salted out with a 20% sodium chloride, calculated on the reaction volume, suction-filtered and dried in a vacuum drier at 80°–100° C. 70 Parts of a 70% duestuff was obtained which, in form of the free acid corresponds to the formula

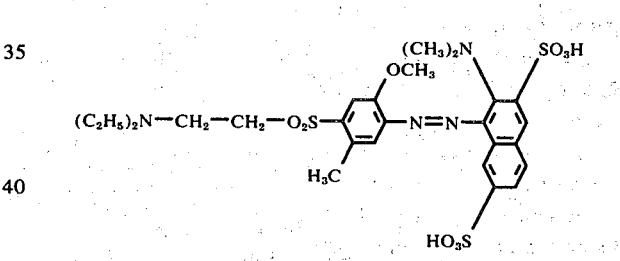

In the presence of acid binding agents the dyestuff presents on nitrogen-containing fibers and cellulose fibers clear orange dyeings and prints with the fastnesses as quoted in Example 4. Printing pastes and padding liquors of the dyestuff, containing alkaline agents, can be stored for several months at a temperature of 20°–30° C.

EXAMPLE 7:

64.2 Parts of the dyestuff obtained according to Example 6 are suspended in 750 parts by volume of water at 40° C; afterwards 15 parts of crystallized sodium acetate are added and 175 parts of dimethylsulfate are introduced dropwise, in a regular rythm, in the course of one hour, beneath the surface of the liquid while stirring. By addition of sodium carbonate the pH value is maintained at 7.5 – 8.0 during the complete reaction time. Stirring is continued during 2 hours at 40° C in the course of which the pH value should not fall below 7.0. 25% Potassium chloride, calculated on the weight of the reaction mixture, are added and stirring is continued for several hours; the precipitated dyestuff is suction-filtered and dried at 50°–60° C in a vacuum drier. The dyestuff obtained is a brown-red, easily water-soluble powder. This dyestuff corresponds in form of the free acid probably to the formula

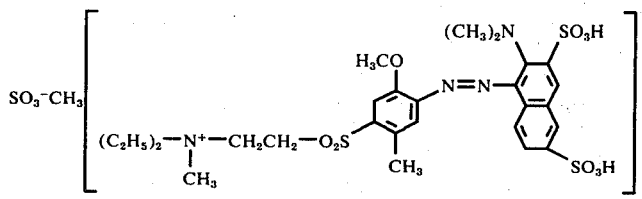

If applied on wool, polyamide or cellulosic materials in the presence of acid-binding agents the dyestuff yields dyeings and prints of the same shade and with the same good fastnesses as the dyestuff described in Example 4.

EXAMPLE 8:

36.1 Parts of 1-aminobenzene-5-β-sulfatoethylsulfone-2-sulfonic acid are dissolved with sodium carbonate in 100 parts by volume of water to give a neutral solution; 35 parts by volume of a 31% hydrochloric acid are added, and the amine compound is diazotized at 0° to 5° C by adding 20 parts by volume of a 5N sodium nitrite solution. A neutral solution of 30.3 parts of 2-naphthylamine-3,6-disulphonic acid in 100 parts by volume of water are added to the mixture; the pH value is adjusted at 2 – 4 and the mixture is stirred during 2 hours. After the coupling the pH value is adjusted at 6 by adding sodium carbonate and the solution of the dyestuff is spray-dried. 95 Parts of a salt-containing dyestuff having a strength of 65% were obtained, corresponding in form of the free acid to the formula

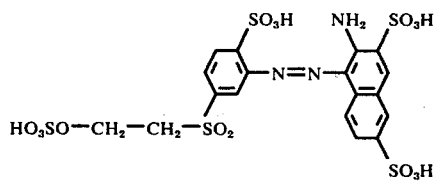

The dyestuff gives in weakly acid, in neutral and alkaline medium on wool, silk, polyamide and polyurethane fiber materials as well as on cellulose fibers, orange dyeings and prints of a good color build-up and very good fastnesses to light and wet processing. The dyeings and prints present an excellent fastness to chlorine and other oxydizing agents as well as to exhaust gas.

The prints present a very high sharpness of the outlines and purity of the white bottom.

EXAMPLE 9:

20.1 Parts of aminobenzene-3-β-hydroxyethylsulfone are dissolved in 300 parts by volume of water. 40 Parts of 31% hydrochloric acid are added to the solution, the reaction mixture was cooled to 0° to 5° C, and diazotization is carried out by adding 20 parts by volume of a 5N sodium nitrite solution. Therefore, the solution of 31.7 parts of 2-N-methylamino-naphthalene-3,7-disulfonic acid in 150 parts by volume of water are added, and coupling is effected at a pH value of 3 –4 adjusted by a concentrated aqueous sodiumhydroxide solution. After a several hours' stirring the dyestuff is salted out by addition of 10% sodium chloride calculated on the volume of the reaction mixture to the coupling solution. After drying 65 parts of a salt-containing dyestuff having a strength of 70%, was obtained which, in form of the free acid corresponds to the formula

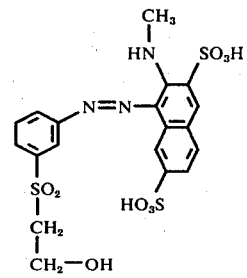

If the dyestuff is printed on wool, polyamide or cellulose fibers in the presence of acid binding agents and subsequently steamed or thermofied, it gives prints of reddish yellow shades with good fastnesses to washing and to light and to chlorine.

EXAMPLE 10:

26.5 Parts of pure dyestuff of Example 9 are added in the course of one hour to a mixture of 42.5 parts of polyphosphoric acid (85% P$_2$O$_5$) and 7.5 parts of an 80% orthophosphoric acid; the mixture is heated in the course of 1 hour up to 130° C and stirred during 1 to 2 hours until complete dissolution. Afterwards the reaction mixture is poured into 75 parts by volume of water and stirring is continued for 2 hours at 80°–90° C. The dyestuff is salted out with potassium chloride and the precipitated dyestuff is suction-filtered. The dyestuff so obtained corresponds, in form of the free acid to the formula

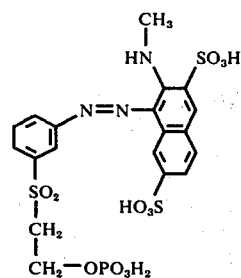

The wet press cake is dissolved in 100 parts by volume of water, the solution is neutralized with calcined soda then spray-dried. 40 Parts of a 68% dyestuff of the above mentioned structure is obtained which is very well soluble in water. When applied according to a method usually practiced for reactive dyestuffs on wool, silk, polyamide, polyurethane and cellulose fiber materials, clear reddish yellow dyeings and prints with good fastnesses are obtained, excelling especially by their fastness to light and to chlorine

EXAMPLE 11:

26.5 Parts of the pure dyestuff of Example 10 are added at room temperature to 85 parts of concentrated sulfuric acid and stirred until complete dissolution. Afterwards, the reaction mixture is stirred on 250 parts of ice and neutralized with 88 parts of calcined soda. The precipitation of the dyestuff is completed by adding sodium chloride. After drying 42 parts of a 62% dyestuff was obtained which, in form of the free acid corresponds to the formula

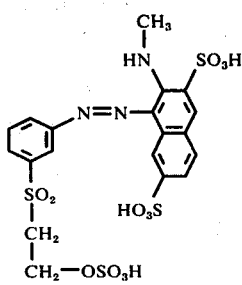

When applied according to a method usually practiced for dyestuffs on nitrogen-containing and cellose fiber materials reddish yellow dyeings and prints are obtained having good fastnesses to wet processing and to light as well as good stability to chlorine and other oxydizing agents.

The dyestuffs listed in the following Table can be prepared in a manner similar to that described in the foregoing examples. They give on wool, silk, polyamide, polyurethane and cellulose materials dyeings and prints which have similarly good properties of fastness. The before-mentioned Examples as well as the examples shown in the following Table do in no way limit the extent of the invention.

TABLE

| No. | Diazo component | azo component | Shade on cotton |
|---|---|---|---|
| 1 | 1-aminobenzene-4-β-sulfato-ethylsulfone | 2-naphthylamine-3,7-disulfonic acid | yellow, reddish |
| 2 | " | 2-methylaminonaphthalene-3,6-disulfonic acid | yellow, reddish |
| 3 | " | 2-phenylaminonaphthalene-3,6-disulfonic acid | orange |
| 4 | " | | |
| 4 | " | 2-dimethylaminonaphthalene-3,6-disulfonic acid | orange |
| 5 | 1-aminobenzene-4-β-phosphato-ethylsulfone | 2-naphthylamine-3,6-disulfonic acid | yellow, reddish |
| 6 | 1-aminobenzene-4-β-dimethylaminoethylsulfone | 2-naphthylamine-3,7-disulfonic acid | gold, reddish |
| 7 | 1-aminobenzene-4-βtrimethyl-ammoniumethylsulfone-sulfuric acid | " | yellow, reddish |
| 8 | 1-aminobenzene-4-βchloro-ethylsulfone | 2-naphthylamine-3,6-disulfonic acid | yellow, reddish |
| 9 | 1-aminobenzene-4-β-phenoxyethylsulfone | " | yellow, reddish |
| 10 | 1-aminobenzene-4-β-acetoxyethylsulfone | 2-naphthylamine-3,7-disulfonic acid | yellow, reddish |
| 11 | 1-aminobenzene-4-β-ethyl-sulfatoethylsulfone | " | yellow, reddish |
| 12 | 1-aminobenzene-4-β-p-toluenesulfatoethyl-sulfone | 2-naphthylamine-3,6-disulfonic acid | yellow, reddish |
| 13 | 1-aminobenzene-4-β-oxyethylsulfone | " | yellow, reddish |
| 14 | 1-aminobenzene-3-β-sulfato-ethylsulfone | " | yellow, reddish |
| 15 | 1-aminobenzene-3-β-sulfatoethylsulfone | 2-naphthylamine-3,7-disulfonic acid | yellow, reddish |
| 16 | 1-amino-2-methoxybenzene-5-β-sulfatoethylsulfone | " | orange |
| 17 | " | 2-naphthylamine-3,6-disulfonic acid | orange |
| 18 | 1-amino-2-methoxybenzene-4-β-sulfatoethylsulfone | 2-naphthylamine-3,6-disulfonic acid | orange |
| 19 | " | 2-naphthylamine-3,7-disulfonic acid | orange |
| 20 | 1-amino-2-methoxy-5-methylbenzene-4-β-sulfatoethylsulfone | " | orange |
| 21 | " | 2-naphthylamine-3,6-disulfonic acid | orange |
| 22 | 1-amino-2,5-dimethoxybenzene 4-β-sulfatoethylsulfone | " | orange, reddish |
| 23 | 1-amino-2,5-dimethoxybenzene-4-β-sulfatoethylsulfone | 2-naphthylamine-3,7-disulfonic acid | orange, reddish |
| 24 | 1-amino-2,6-dichlorobenzene-β-sulfatoethylsulfone | 2-naphthylamine-3,6-disulfonic acid | orange, reddish |
| 25 | " | 2-naphthylamine-3,7-disulfonic acid | orange, reddish |
| 26 | 1-amino-2-methoxy-5-chlorobenzene- | " | orange |

TABLE-continued

| No. | Diazo component | azo component | Shade on cotton |
|---|---|---|---|
| 27 | 4-β-sulfatoethylsulfone<br>" | 2-naphthylamine-3,6-disulfonic acid | orange |
| 28 | 1-amino-2-chlorobenzene-5-β-sulfatoethylsulfone | " | yellow, reddish |
| 29 | " | 2-naphthylamine-3,7-disulfonic acid | yellow, reddish |
| 30 | 1-aminobenzene-2-β-sulfatoethylsulfone | 2-naphthylamine-3,6-disulfonic acid | yellow, reddish |
| 31 | " | 2-naphthylamine-3,7-disulfonic acid | yellow, reddish |
| 32 | 1-amino-4bromobenzene-6-β-sulfatoethylsulfone | " | yellow, reddish |
| 33 | " | 2-naphthylamine-3,6-disulfonic acid | yellow, reddish |
| 34 | 1-amino-2,6-dimethylbenzene-4-β-sulfatoethylsulfone | 2-naphthylamine-3,6-disulfonic acid | yellow, reddish |
| 35 | " | 2-naphthylamine-3,6-disulfonic acid | yellow, reddish |

What we claim is:

1. Water-soluble monoazo compound which, in the form of the free acid, corresponds to the formula

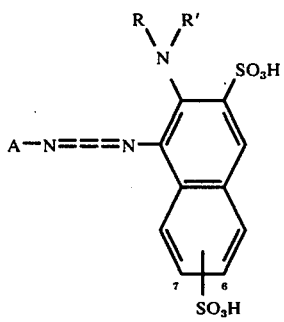

wherein A is

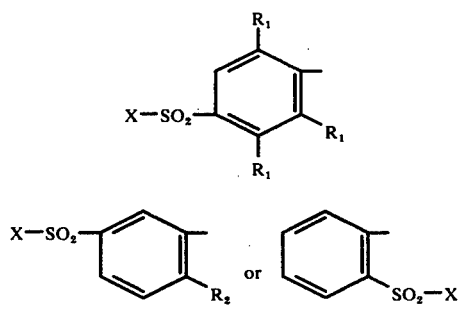

wherein
  $R_1$ are identical or different, and each is hydrogen, chorine, alkyl with 1 to 4 carbon atoms, or alkoxy with 1 to 4 carbon atoms,
  $R_2$ is hydrogen, chlorine, bromine, sulfo, sulfonic acid amide or alkoxy of 1 to 4 carbon atoms, X is vinyl or —$CH_2$-$CH_2$-Z, in which Z is an inorganic or organic radical capable of being split off by an alkaline agent selected from the group consisting of hydroxy, chlorine, bromine, alkylsulphonyloxy or alkylsulfonylamino, each having 1 to 5 carbon atoms, arylsulfonyloxy, arylsulfonylamino, alkanyloxy having 1 to 4 carbon atoms, trialkylammonium having 1 to 4 carbon atoms in each of the alkyl groups, thiosulfato or its metal salts, phosphato or its metal salts and sulfato, or its metal salts, R is hydrogen or alkyl with 1 to 4 carbon atoms, R' is hydrogen, alkyl with 1 to 4 carbon atoms, phenyl, or phenyl substituted by methyl, ethyl, methoxy or ethoxy and the sulfonic acid in the naphthyl radical is in 6- or 7-position.

2. A compound as claimed in claim 1 wherein Z is chlorine, sulfato, phosphato, thiosulfato or acetoxy.

3. A compound as claimed in claim 1 wherein X is vinyl.

4. A compound as claimed in claim 1 wherein Z is dimethylamino or diethylamino.

5. A compound of the formula

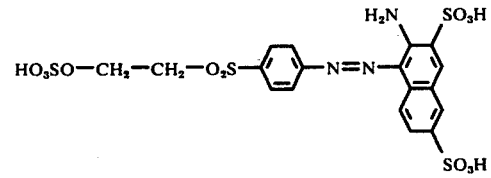

6. A compound of the formula

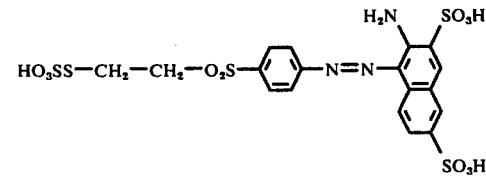

7. A compound of the formula

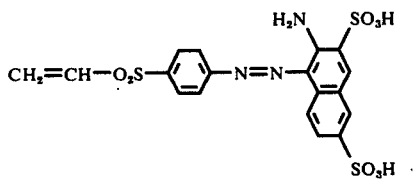

8. A compound of the formula

9. A compound of the formula
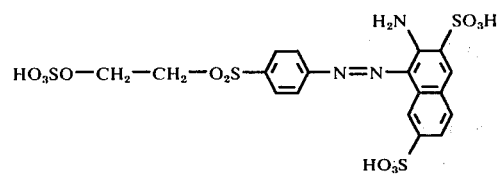
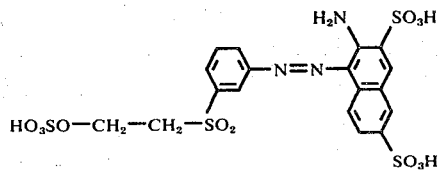
* * * * *